UNITED STATES PATENT OFFICE.

ROBERTO SCHIFF, OF PISA, ITALY, ASSIGNOR TO THE FARBWERKE, VORMALS MEISTER, LUCIUS & BRÜNING, OF HOCHST-ON-THE-MAIN, GERMANY.

SALICYLIC COMPOUND AND METHOD OF MAKING SAME.

SPECIFICATION forming part of Letters Patent No. 569,429, dated October 13, 1896.

Application filed December 11, 1895. Serial No. 571,812. (Specimens.)

*To all whom it may concern:*

Be it known that I, ROBERTO SCHIFF, doctor of philosophy and professor of chemistry, a citizen of the Kingdom of Italy, residing at Pisa, Italy, have invented certain new and useful Improvements in the Manufacture of a Compound of Salicylic Acid and Hexamethylenetetramin, of which the following is a specification.

I have discovered that on combining salicylic acid with hexamethylenetetramin a new substance is formed. In order to manufacture this substance, I bring salicylic acid and hexamethylenetetramin together in quanties proportional to their molecular weights, for instance, in benzene solution. On cooling the new product crystallizes out.

Example: I proceed in the manner following: 1.38 kilograms of salicylic acid and 1.4 kilograms hexamethylenetetramin are covered with benzene and heated to boiling, benzene being added until all is dissolved. On cooling the new compound separates out as a white crystalline mass, which is obtained in the pure state by filtering, pressing, and drying.

The new compound is easily soluble in water or alcohol, less soluble in ether, ligroin, or benzene. It crystallizes readily from solutions in benzene and melts at 95° centigrade. Heated in presence of air to melting-point it first becomes yellow, and then brown.

The new compound is used as a remedy for rheumatic gout, and administered in doses of from one to two grams for adults and half a gram for children.

I claim—

1. The process herein described of manufacturing a compound from salicylic acid and hexamethylenetetramin, which consists in dissolving both substances simultaneously in benzene while heating the mixture, and then permitting the resulting product to crystallize from the solution, substantially as set forth.

2. The compound of salicylic acid and hexamethylenetetramin a white crystalline product, easily soluble in alcohol or water, less soluble in benzene, ether, or ligroin and melting at 95° centigrade.

In testimony that I claim the foregoing as my invention I have signed my name in presence of two subscribing witnesses.

ROBERTO SCHIFF.

Witnesses:
ALEX. S. ROSENTHAL,
EMILIO MASI.